United States Patent
Azrad

(10) Patent No.: US 7,685,221 B1
(45) Date of Patent: Mar. 23, 2010

(54) EFFICIENT REMAINDER CALCULATION FOR EVEN DIVISORS

(75) Inventor: Guy Azrad, Binyamina (IL)

(73) Assignee: Marvell Israel (M.I.S.L.) Ltd., Yokneam (IL)

( * ) Notice: Subject to any disclaimer, the term of this patent is extended or adjusted under 35 U.S.C. 154(b) by 1105 days.

(21) Appl. No.: 10/391,129

(22) Filed: Mar. 17, 2003

(51) Int. Cl.
*G06F 7/38* (2006.01)

(52) U.S. Cl. ...................................... 708/491

(58) Field of Classification Search .................. 708/491, 708/650, 653
See application file for complete search history.

(56) References Cited

U.S. PATENT DOCUMENTS

| | | | |
|---|---|---|---|
| 3,527,930 A * | 9/1970 | Freiman et al. ............. | 708/650 |
| 5,479,365 A | 12/1995 | Ogura | |
| 5,499,202 A | 3/1996 | Takahashi et al. | |
| 5,987,487 A | 11/1999 | Welland | |
| 6,138,138 A | 10/2000 | Ogura | |
| 6,151,393 A | 11/2000 | Jeong | |
| 6,175,850 B1 * | 1/2001 | Ishii et al. .................... | 708/491 |
| 6,317,772 B1 * | 11/2001 | Carlson ....................... | 708/655 |
| 6,477,556 B1 * | 11/2002 | Matsui ........................ | 708/650 |

\* cited by examiner

*Primary Examiner*—Chuong D Ngo

(57) ABSTRACT

In general, in one aspect, the invention features a circuit, method, and computer-readable media for calculating xmody, wherein x and y are binary numbers, and wherein y is an even number. The circuit comprises a power of two calculator adapted to receive signals representing binary number y and to provide signals representing binary numbers r and m, wherein $y=r2^m$; a vector splitter adapted to receive signals representing binary number x and signals representing the binary number m, and to provide signals representing binary numbers x[w:m] and x[m−1:0], wherein the binary number x[m−1:0] comprises the m least-significant bits of the binary number x and the binary number x[w:m] comprises the w−m+1 most-significant bits of the binary number x; and a remainder calculator adapted to receive the signals representing the binary numbers x[w:m] and r, and to provide a binary number x[w:m]modr, wherein the binary number x[w:m] modr is a remainder of a quotient of the binary number x[w: m] divided by the binary number r; wherein the binary number x[w:m]modr comprises the most-significant bits of a binary number representing xmody and the binary number x[m−1:0] comprises the least-significant bits of the binary number representing xmody.

14 Claims, 4 Drawing Sheets

EFFICIENT REMAINDER CALCULATION FOR EVEN DIVISORS

BACKGROUND

The present invention relates generally to the calculation of remainders. More particularly, the present invention relates to efficient remainder calculation for even divisors.

SUMMARY

In general, in one aspect, the invention features a circuit for calculating xmody, wherein x and y are binary numbers, and wherein y is an even number, comprising a power of two calculator adapted to receive signals representing binary number y and to provide signals representing binary numbers r and m, wherein $y=r2^m$; a vector splitter adapted to receive signals representing binary number x and signals representing the binary number m, and to provide signals representing binary numbers x[w:m] and x[m−1:0], wherein the binary number x[m−1:0] comprises the m least-significant bits of the binary number x and the binary number x[w:m] comprises the w−m+1 most-significant bits of the binary number x; and a remainder calculator adapted to receive the signals representing the binary numbers x[w:m] and r, and to provide a binary number x[w:m]modr, wherein the binary number x[w:m]modr is a remainder of a quotient of the binary number x[w:m] divided by the binary number r; wherein the binary number x[w:m]modr comprises the most-significant bits of a binary number representing xmody and the binary number x[m−1:0] comprises the least-significant bits of the binary number representing xmody.

Particular implementations can include one or more of the following features. m is the maximum power of two by which the binary number y is divisible with no remainder. The circuit further comprises a buffer adapted to receive signals representing the binary number x[w:m]modr and the binary number x[m−1:0], and to provide the binary number xmody. The circuit further comprises a second buffer adapted to store the binary number y, and to provide the signals representing the binary number y; a third buffer adapted to store the binary number x, and to provide the signals representing the binary number x. The power of two calculator comprises a memory. The vector splitter comprises a memory. The remainder calculator comprises a memory.

In general, in one aspect, the invention features a method and computer-readable media for calculating xmody, wherein x and y are binary numbers, and wherein y is an even number. It comprises calculating binary numbers r and m, wherein $y=r2^m$; calculating binary numbers x[w:m] and x[m−1:0], wherein the binary number x[m−1:0] comprises the m least-significant bits of the binary number x and the binary number x[w:m] comprises the w−m+1 most-significant bits of the binary number x; and calculating a binary number x[w:m]modr, wherein the binary number x[w:m]modr is a remainder of a quotient of the binary number x[w:m] divided by the binary number r; wherein the binary number x[w:m]modr comprises the most-significant bits of a binary number representing xmody and the binary number x[m−1:0] comprises the least-significant bits of the binary number representing xmody.

Particular implementations can include one or more of the following features. m is the maximum power of two by which the binary number y is divisible with no remainder. Implementations comprise concatenating the binary number x[w:m]modr and the binary number x[m−1:0] with the binary number x[w:m]modr comprising the most-significant bits of the concatenation and the binary number x[m−1:0] comprising the least-significant bits of the concatenation. Implementations comprise retrieving binary numbers x and y. Implementations comprise storing the binary number representing xmody.

In general, in one aspect, the invention features a circuit for calculating xmody, wherein x and Y are binary numbers, and wherein Y is a predetermined even number, comprising a remainder calculator adapted to receive signals representing the binary number x[w:M], wherein x[w:M] comprises the w−M+1 most-significant bits of the binary number x, and to provide a binary number x[w:M]modR, wherein the binary number x[w:M]modR is a remainder of a quotient of the binary number x[w:M] divided by the binary number R, and wherein $Y=R2^M$; wherein the binary number x[w:M]modR comprises the most-significant bits of a binary number representing xmodY and the binary number x[M−1:0] comprises the least-significant bits of the binary number representing xmodY.

Particular implementations can include one or more of the following features. M is the maximum power of two by which the binary number Y is divisible with no remainder. The circuit further comprises a buffer adapted to receive signals representing the binary number x[w:M]modR and the binary number x[M−1:0], and to provide the binary number xmodY. The circuit further comprises a second buffer adapted to store the binary number x, and to provide the signals representing the binary number x. The remainder calculator comprises a memory.

In general, in one aspect, the invention features a method and computer-readable media for calculating xmodY, wherein x and Y are binary numbers, and wherein Y is a predetermined even number. It comprises receiving the binary number x[w:M], wherein x[w:M] comprises the w−M+1 most-significant bits of the binary number x; and calculating a binary number x[w:M]modR, wherein the binary number x[w:M]modR is a remainder of a quotient of the binary number x[w:M] divided by the binary number R, and wherein $y=R2^M$; wherein the binary number x[w:M]modR comprises the most-significant bits of a binary number representing xmodY and the binary number x[M−1:0] comprises the least-significant bits of the binary number representing xmodY.

Particular implementations can include one or more of the following features. M is the maximum power of two by which the binary number Y is divisible with no remainder. Implementations comprise concatenating the binary number x[w:M]modR and the binary number x[M−1:0] with the binary number x[w:M]modR comprising the most-significant bits of the concatenation and the binary number x[M−1:0] comprising the least-significant bits of the concatenation. Implementations comprise retrieving binary numbers x and Y. Implementations comprise storing the binary number representing xmodY.

The details of one or more implementations are set forth in the accompanying drawings and the description below. Other features will be apparent from the description and drawings, and from the claims.

Figure 1:
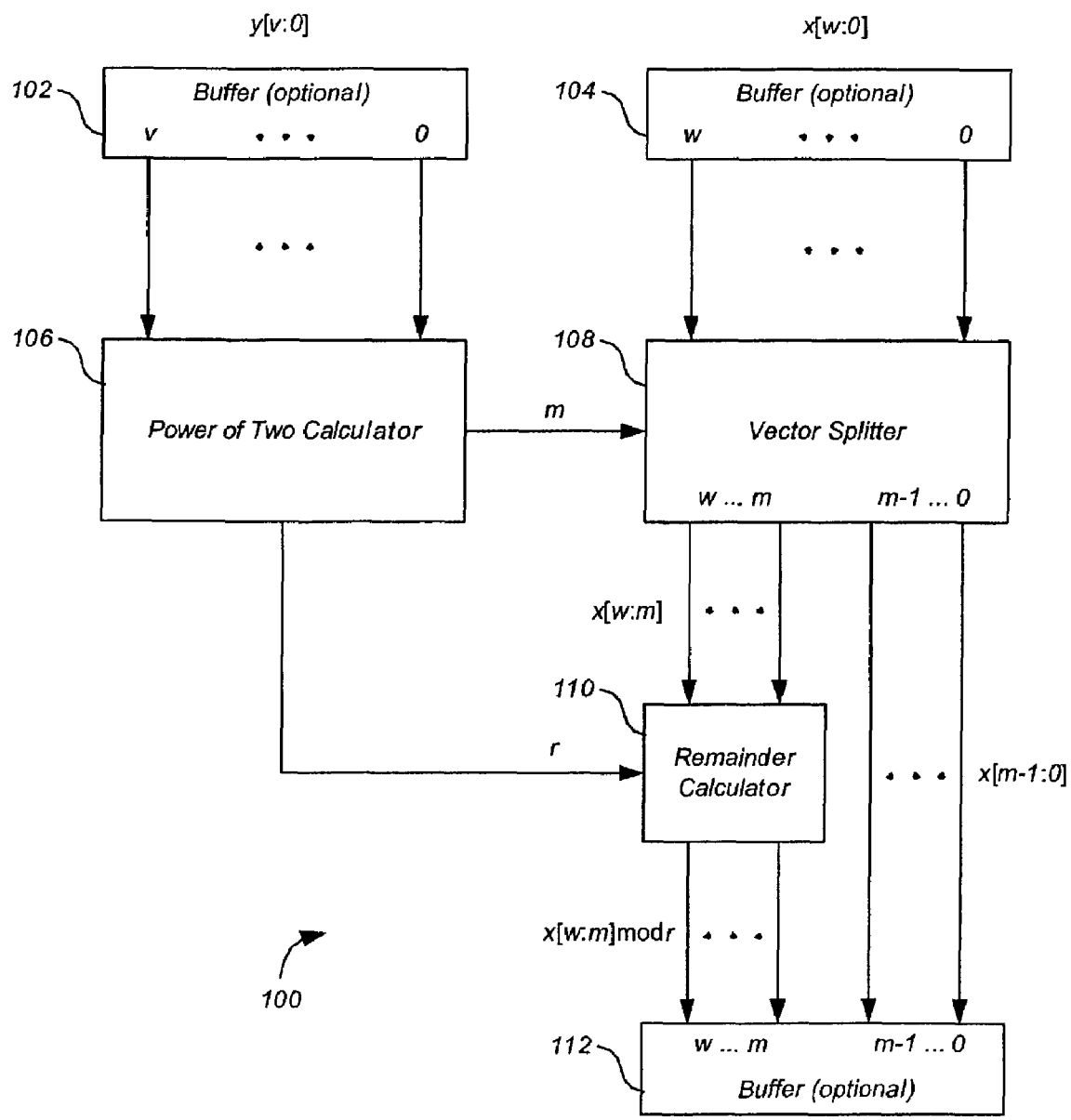
FIG. 1 is a circuit diagram of a circuit for calculating xmody according to a preferred embodiment.

The leading digit(s) of each reference numeral used in this specification indicates the number of the drawing in which the reference numeral first appears.

DETAILED DESCRIPTION

It is often desirable to obtain the remainder of the quotient (also known as the modulo) of two numbers, which can be written as xmody, where xmody is the remainder of the quotient of dividend x divided by divisor y. This calculation has many uses. For example, in the data communications field, the remainder can be used to hash numbers such as media access control and Internet Protocol addresses in a network switch, to mask destination port vectors in a network switch, and as part of calculating a pointer to a memory location, to name only a few.

Conventional circuits for calculating such a remainder generally consume significant time and circuitry. However, embodiments of the present invention significantly reduce the time and circuitry required when the divisor is even, that is, a product of a power of two.

The following observations may be useful in understanding the invention. In this description, the notation i[j:k] represents a binary vector comprising all or part of a binary number i, where j represents the position in binary number i of the most-significant bit of the vector, and k represents the position in binary number i of the least-significant bit of the vector. When divisor y is even, y can be represented as $$y = zr \quad (1)$$

where $$z = 2^m \quad (2)$$

Then $$n = x \bmod y = x \bmod (zr) = ((x/z) \bmod (r))z + x \bmod z \quad (3)$$

Let dividend x be a binary number having w+1 bits, x[w:0].
Let divisor y be a binary number having v+1 bits, y[v:0].
Let z be a binary number having m+1 bits, z[m:0].
Let r be a binary number having n+1 bits, r[n:0].
For any even y, $$y[v:0] = z[m:0] * r[n:0] \quad (4)$$

Then $$xmody = xmod(zr) \quad (5)$$

$$= ((x/z)modr) * 2^m + xmod(2^m) \quad (6)$$

$$= ((x \gg m)modr) \ll m + x[m-1:0] \quad (7)$$

where a>>b represents a shifted right by b bits and a<<b represents a shifted left by b bits. Then $$x \bmod y = \{x[w:m] \bmod r, x[m-1:0]\} \quad (8)$$

where {a, b} represents the concatenation of a and b, with a occupying the most-significant bits of the concatenation and b occupying the least-significant bits of the concatenation.

FIG. 1 is a circuit diagram of a circuit 100 for calculating xmody according to a preferred embodiment. Circuit 100 comprises optional buffers 102 and 104, a power of two calculator 106, a vector splitter 108, and a remainder calculator 110, and optional buffer 112. Optional buffers 102, 104, and 112 can be implemented as flip-flops or other sorts of memory elements. Calculator 106, vector splitter 108, and calculator 110 can be implemented in any number of ways, such as logic circuits, memories storing look-up tables, or software.

Figure 2:
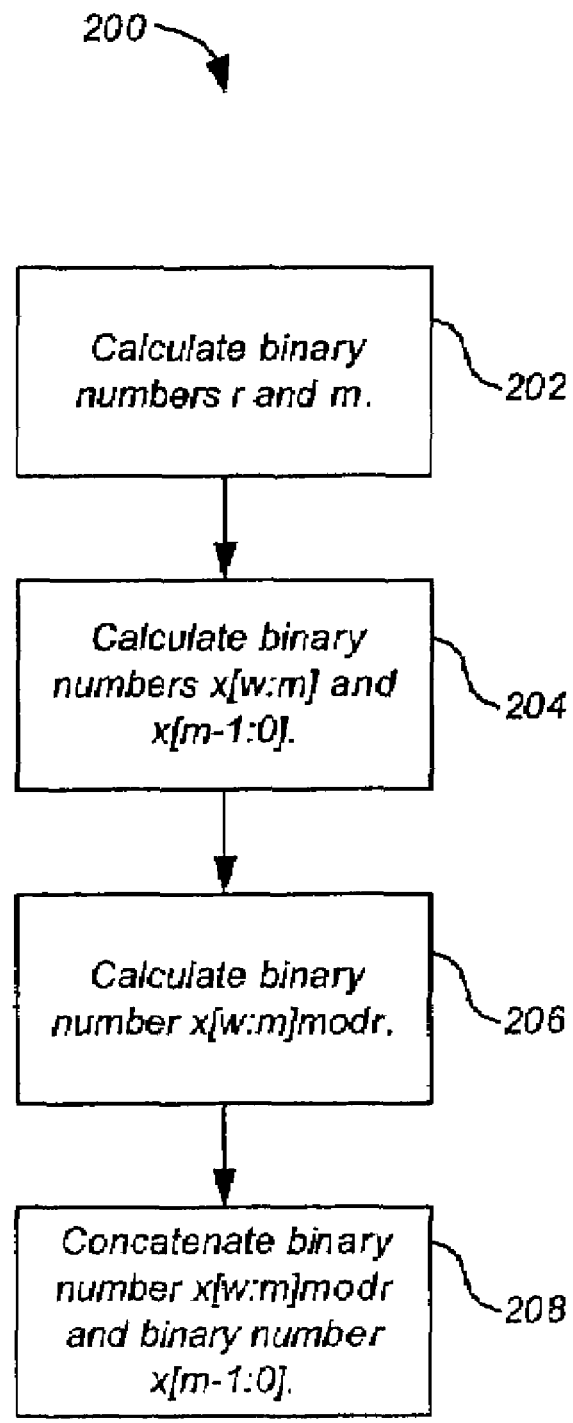
FIG. 2 is a flowchart depicting a process for calculating xmody according to a preferred embodiment.

FIG. 2 is a flowchart depicting a process 200 for calculating xmody according to a preferred embodiment. Although process 200 is described with reference to circuit 100 of FIG. 1, process 200 can be implemented by other circuits, as will be apparent to one skilled in the relevant arts after reading this description. Further, although the steps of process 200 are described in a particular order, other orders can be used, as will be apparent to one skilled in the relevant arts after reading this description.

At the start of process 200, divisor y[v:0] is present in optional buffer 102, and dividend x[w:0] is present in optional buffer 104. Of course, in circuits not employing optional buffers 102 and 104, divisor y[v:0] and dividend x[w:0] can be provided by other circuit elements.

Process 200 calculates binary numbers r and m, wherein $y = r2^m$ (step 202). In circuit 100 of FIG. 1, calculating binary numbers r and m comprises applying binary number y to calculator 106. In response, calculator 106 provides binary numbers r and m. Binary number m can be determined in any number of ways. For example, binary number m can be determined by simply counting the number of consecutive zeros in binary number y, starting with the least-significant bit. Preferably m is the maximum power of two by which binary number y is divisible with no remainder. However, in other embodiments, m is a lesser power of two.

Process 200 calculates binary numbers x[w:m] and x[m−1:0] (step 204). Binary number x[m−1:0] comprises the m least-significant bits of binary number x. Binary number x[w:m] comprises the w−m+1 most-significant bits of binary number x. In circuit 100 of FIG. 1, calculating binary numbers x[w:m] and x[m−1:0] comprises applying binary numbers x and m to vector splitter 108. In response, vector splitter 108 provides binary numbers x[w:m] and x[m−1:0]. Vector splitter 108 can calculate binary numbers x[w:m] and x[m−1:0] in any number of ways, for example by multiplexing the bits of binary numbers x according to the value of binary number m.

Process 200 calculates binary number x[w:m]modr (step 206). Binary number x[w:m]modr is the remainder of the quotient of binary number x[w:m] divided by binary number r. In circuit 100 of FIG. 1, calculating binary number x[w:m]modr comprises applying binary numbers r and x[w:m] to remainder calculator 110. In response, remainder calculator 110 provides binary number x[w:m]modr. Remainder calculator 110 can be implemented in any number of ways, for example as a memory such as a look-up table.

Process 200 concatenates binary number x[w:m]modr and binary number x[m−1:0] (step 208). Binary number x[w:m]modr comprises the most-significant bits of the concatenation. Binary number x[m−1:0] comprises the least-significant bits of the concatenation. The concatenation is the binary number xmody. In circuit 100 of FIG. 1, optional buffer 112 concatenates binary number x[w:m]modr and binary number x[m−1:0]. Thus binary number xmody is available in optional buffer 112. Of course, in circuits not employing optional buffer 112, the concatenation can be performed by other circuit elements.

Figure 3:
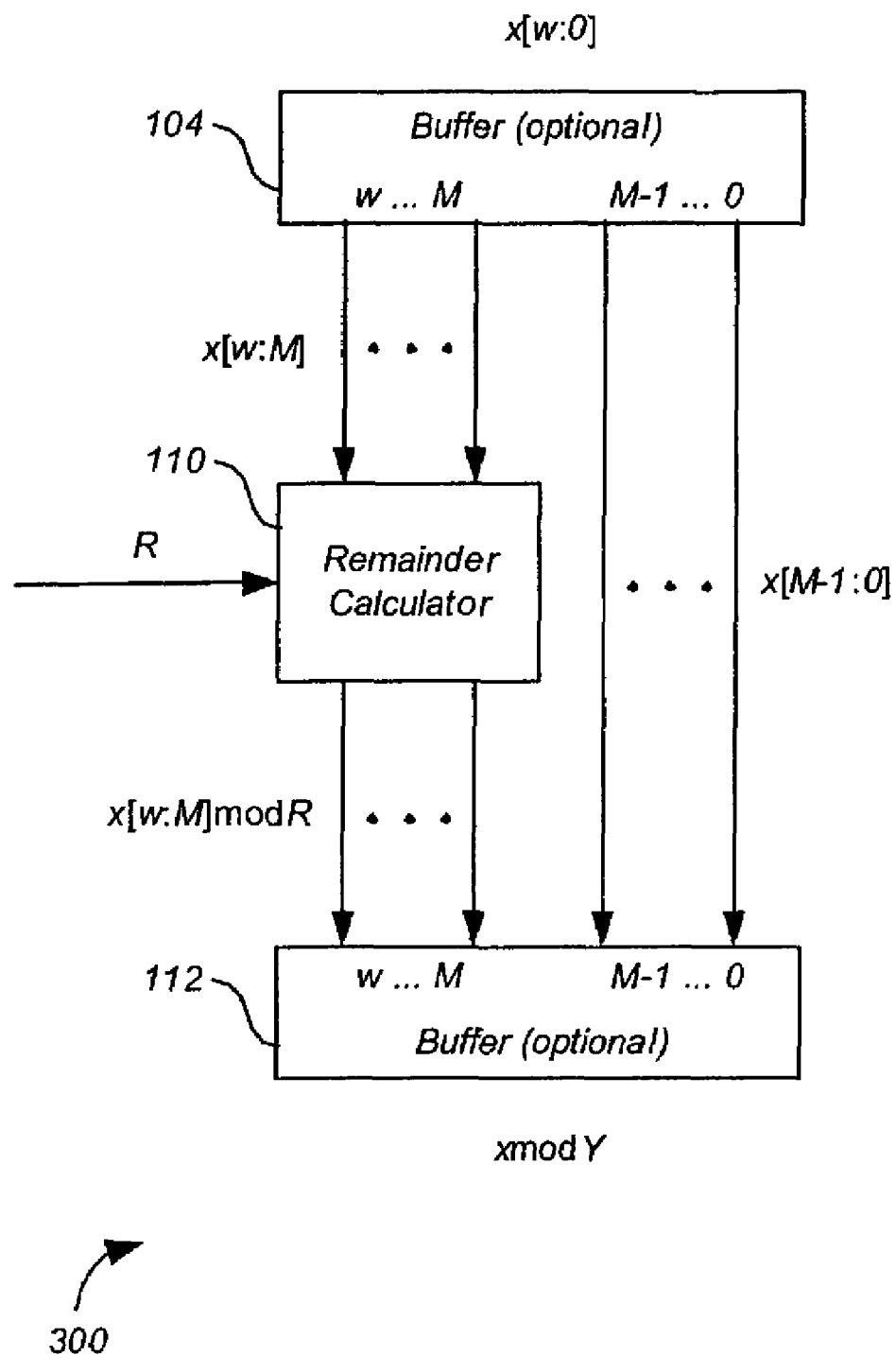
FIG. 3 is a circuit diagram of a circuit for calculating xmodY for a predetermined fixed value of Y according to a preferred embodiment.

In some cases, where y has a predetermined fixed value Y, circuit 100 of FIG. 1 can be simplified. FIG. 3 is a circuit diagram of a circuit 300 for calculating xmodY for a predetermined fixed value of Y according to a preferred embodiment. Circuit 300 comprises optional buffer 104, remainder calculator 110, and optional buffer 112. Optional buffers 104 and 112 can be implemented as flip-flops or other sorts of memory elements. Because the value of divisor Y is fixed, the minterms M and R of divisor Y are known, and so needn't be calculated by circuit 300. Calculator 110 can be implemented in any number of ways, such as logic circuits, a memory storing a look-up table, or software.

Figure 4:
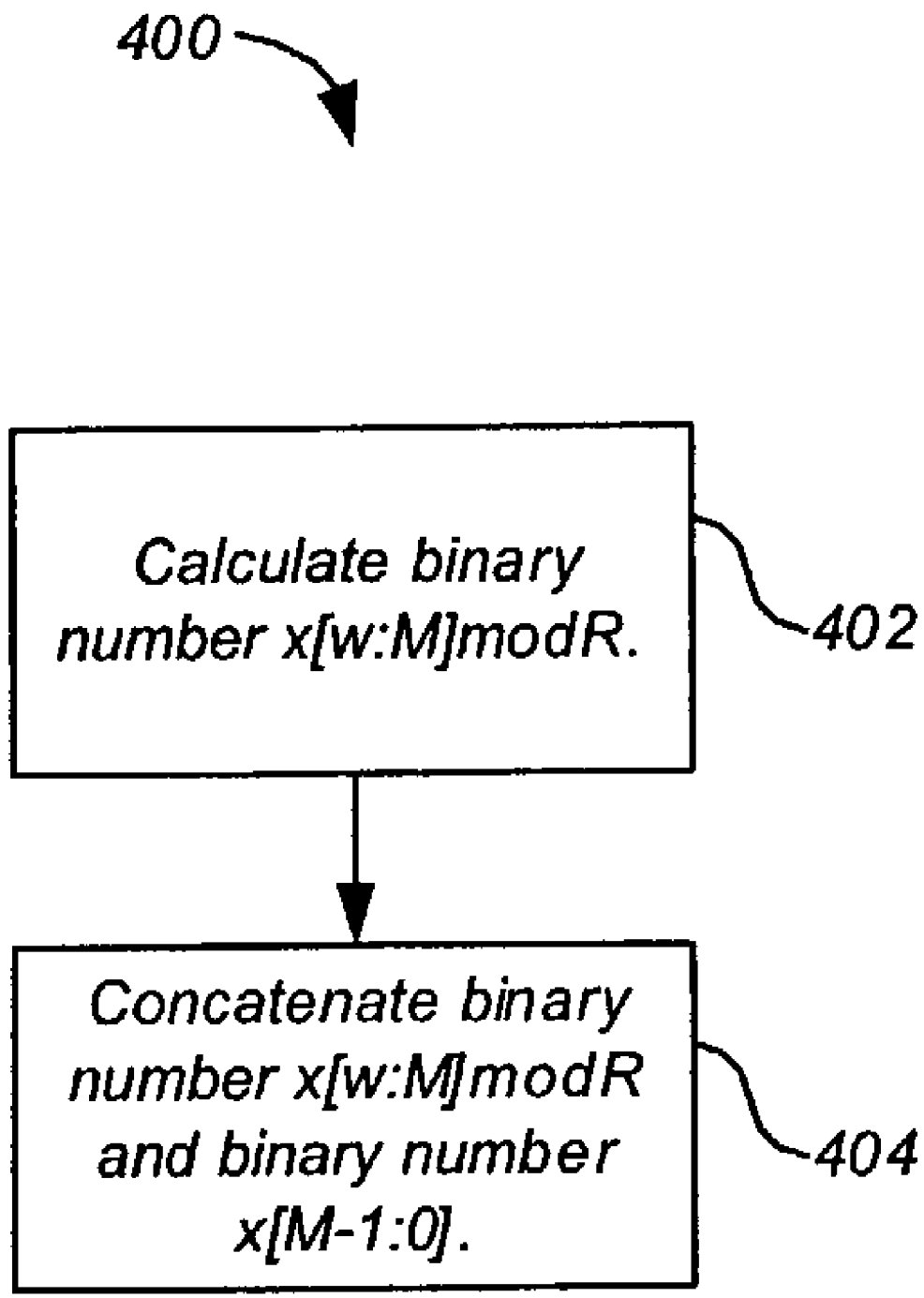
FIG. 4 is a flowchart depicting a process for calculating xmodY where Y is a predetermined number according to a preferred embodiment.

FIG. 4 is a flowchart depicting a process 400 for calculating xmodY where Y is a predetermined number according to a preferred embodiment. Although process 400 is described with reference to circuit 300 of FIG. 3, process 400 can be implemented by other circuits, as will be apparent to one skilled in the relevant arts after reading this description. Further, although the steps of process 400 are described in a particular order, other orders can be used, as will be apparent to one skilled in the relevant arts after reading this description.

At the start of process 400, dividend x[w:0] is present in optional buffer 104. Of course, in circuits not employing optional buffer 104, dividend x[w:0] can be provided by other circuit elements.

Process 400 calculates a binary number x[w:M]modR (step 402) where $Y=R2^M$ and binary number x[w:M] comprises the w−M+1 most-significant bits of binary number x. Binary number x[w:M]modR is the remainder of the quotient of binary number x[w:M] divided by binary number R. In circuit 300 of FIG. 3, calculating binary number x[w:M]modR comprises applying binary number x[w:M] to calculator 110. In response, calculator 110 provides binary number x[w:M]modR. Preferably M is the maximum power of two by which binary number Y is divisible with no remainder. However, in other embodiments, M is a lesser power of two.

Process 400 concatenates binary number x[w:M]modR and binary number x[M−1:0] (step 404), where binary number x[M−1:0] comprises the M least-significant bits of binary number x. Binary number x[w:M]modR comprises the most-significant bits of the concatenation. Binary number x[M−1:0] comprises the least-significant bits of the concatenation. The concatenation is binary number xmody. In circuit 300 of FIG. 3, optional buffer 112 concatenates binary number x[w:M]modR and binary number x[M−1:0]. Thus binary number xmodY is available in optional buffer 112. Of course, in circuits not employing optional buffer 112, the concatenation can be performed by other circuit elements.

Compared to a conventional implementation using a single look-up table to calculate xmodY, embodiments of the invention can use a much smaller look-up table. For example, when y is fixed and x is an eight-bit number, a single look-up table would require 256 entries, while look-up table 110 of circuit 300 of FIG. 3 would require only 21 entries.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. A circuit for calculating xmody, wherein x and y are binary numbers, and wherein y is an even number, comprising:
   a power of two calculator adapted to receive signals representing binary number y and to provide signals representing binary numbers r and m, wherein $y=r2^m$;
   a vector splitter adapted to receive signals representing binary number x and signals representing the binary number m, and to provide signals representing binary numbers x[w:m] and x[m−1:0], wherein the binary number x[m−1:0] comprises m least-significant bits of the binary number x and the binary number x[w:m] comprises w−m+1 most-significant bits of the binary number x; and
   a remainder calculator adapted to receive the signals representing the binary numbers x[w:m] and r, and to provide a binary number x[w:m]modr, wherein the binary number x[w:m]modr is a remainder of a quotient of the binary number x[w:m] divided by the binary number r;
   wherein the binary number x[w:m]modr comprises most-significant bits of a binary number representing xmody, the binary number x[m−1:0] comprises least-significant bits of the binary number representing xmody, and the circuit outputs the binary number x[w:m]modr to a network communications device to perform at least one of hashing Internet Protocol addresses, masking destination port vectors, and calculating a pointer to a memory location based at least in part on the binary number x[w:m]modr.

2. The circuit of claim 1, wherein m is a maximum power of two by which the binary number y is divisible with no remainder.

3. The circuit of claim 1, further comprising:
   a buffer adapted to receive signals representing the binary number x[w:m]modr and the binary number x[m−1:0], and to provide the binary number xmody.

4. The circuit of claim 3, further comprising:
   a second buffer adapted to store the binary number y, and to provide the signals representing the binary number y; and a third buffer adapted to store the binary number x, and to provide the signals representing the binary number x.

5. The circuit of claim 1, wherein the power of two calculator comprises a memory.

6. The circuit of claim 1, wherein the vector splitter comprises a memory.

7. The circuit of claim 1, wherein the remainder calculator comprises a memory.

8. A circuit for calculating xmody, wherein x and y are binary numbers, and wherein y is an even number, comprising:

power of two calculator means for receiving signals representing binary number y, and for providing signals representing binary numbers r and m, wherein $y=r2^m$;

vector splitter means for receiving signals representing binary number x and signals representing the binary number m, and for providing signals representing binary numbers x[w:m] and x[m−1:0], wherein the binary number x[m−1:0] comprises m least-significant bits of the binary number x and the binary number x[w:m] comprises w−m+1 most-significant bits of the binary number x; and remainder calculator means for receiving the signals representing the binary numbers x[w:m] and r, and for providing a binary number x[w:m]modr, wherein the binary number x[w:m]modr is a remainder of a quotient of the binary number x[w:m] divided by the binary number r;

wherein the binary number x[w:m]modr comprises the most-significant bits of a binary number representing xmody, the binary number x[m−1:0] comprises the least-significant bits of the binary number representing xmody, and the circuit outputs the binary number x[w:m]modr to a network communications device to perform at least one of hashing Internet Protocol addresses, masking destination port vectors, and calculating a pointer to a memory location based at least in part on the binary number x[w:m]modr.

9. The circuit of claim 8, wherein m is maximum power of two by which the binary number y is divisible with no remainder.

10. The circuit of claim 8, further comprising:

buffer means for receiving signals representing the binary number x[w:m]modr and the binary number x[m−1:0], and for providing the binary number xmody.

11. The circuit of claim 10, further comprising:

second buffer means for storing the binary number y, and for providing the signals representing the binary number y; and third buffer means for storing the binary number x, and for providing the signals representing the binary number x.

12. The circuit of claim 8, wherein the power of two calculator means comprises memory means.

13. The circuit of claim 8, wherein the vector splitter means comprises memory means.

14. The circuit of claim 8, wherein the remainder calculator means comprises memory means.

\* \* \* \* \*